US010136208B2

(12) United States Patent
Barnave

(10) Patent No.: US 10,136,208 B2
(45) Date of Patent: Nov. 20, 2018

(54) HEADSET WITH MULTIMEDIA CAPABILITIES

(71) Applicant: Danielle Julienne Barnave, Saint Albans, NY (US)

(72) Inventor: Danielle Julienne Barnave, Saint Albans, NY (US)

(*) Notice: Subject to any disclaimer, the term of this patent is extended or adjusted under 35 U.S.C. 154(b) by 0 days.

(21) Appl. No.: 15/480,198

(22) Filed: Apr. 5, 2017

(65) Prior Publication Data

US 2018/0295438 A1 Oct. 11, 2018

(51) Int. Cl.
*H04R 1/10* (2006.01)
*H04B 1/3827* (2015.01)
*H04R 29/00* (2006.01)

(52) U.S. Cl.
CPC ........... *H04R 1/1016* (2013.01); *H04B 1/385* (2013.01); *H04R 1/105* (2013.01); *H04R 1/1025* (2013.01); *H04R 1/1041* (2013.01); *H04R 29/001* (2013.01); *H04B 2001/3866* (2013.01); *H04R 2420/09* (2013.01); *H04R 2460/13* (2013.01)

(58) Field of Classification Search
CPC ............ H04R 1/1016; H04R 1/101025; H04R 1/1041; H04R 1/105; H04R 1/385; H04R 29/001; H04R 2420/09; H04R 2460/13; H04B 2001/3866
See application file for complete search history.

(56) References Cited

U.S. PATENT DOCUMENTS

| | | | |
|---|---|---|---|
| 9,723,395 B2* | 8/2017 | Kim ..................... | H04R 5/0335 |
| 2017/0048609 A1* | 2/2017 | Schnell ................ | H04R 1/1083 |
| 2017/0343354 A1* | 11/2017 | Chelian ................. | H04B 1/385 |

* cited by examiner

*Primary Examiner* — Brian Ensey

(57) ABSTRACT

An apparatus that can be used as a headset and as a personal surveillance device contains a main body, a pair of earpieces, a microphone, and a camera. The main body is designed to be worn around the neck. The pair of earpieces extend from the main body allowing the user to utilize the apparatus as a headset. The microphone and the camera are externally mounted onto the main body. The positioning of the microphone is beneficial when making a phone call and for recording audio when the apparatus is used as a personal surveillance device. The camera is positioned to capture activity in front of the user. The different functionalities of the apparatus are managed with a control unit that is electronically connected to the electronic components of the present invention. The user utilizes a plurality of controls to control the different functionalities of the apparatus.

10 Claims, 7 Drawing Sheets

HEADSET WITH MULTIMEDIA CAPABILITIES

FIELD OF THE INVENTION

The present invention relates generally to a headset with multimedia capabilities. In general, the present invention is a headset that can be used for personal surveillance and hands-free communications.

BACKGROUND OF THE INVENTION

Lack of personal safety has turned out to be a major issue in the recent past. Theft and assault are some of the most significant issues that need to be addressed immediately. In addition, abuse of individuals has also been on the rise. In many of these cases, the lack of evidence is a major issue. Thus, the victim does not receive justice.

Mobile phones are usually used to obtain evidence during abuse, theft, or other comparable incidents. Since mobile phones are equipped with the latest technology, accurate information can be gathered regarding the incident. However, the use of a mobile phone for gathering evidence may not always be practical since a camera function needs to be accessed. The time taken in accessing the camera function can result in missing crucial information of an event. Also, the act of recording or taking photographs can be obvious to a person committing the crime. Thus, the mobile phone can be seized from the victim or the bystander resulting in the loss of evidence. This in turn can discourage an individual from collecting evidence during another incident.

If a mobile phone is not available, an alternative device needs to be carried to gather evidence. For instance, a voice recorder or a camera needs to be used for recording purposes. The act of carrying the additional electronic device, which is solely used for gathering evidence can be a burden to the user. Therefore, there is a clear need for a device that can be used for personal surveillance while fulfilling other daily requirements.

The objective of the present invention is to address the aforementioned issues. In particular, the present invention introduces an apparatus that can be used for personal surveillance and hands-free communication. By utilizing the present invention, the user is guaranteed to have proof for abuse or involvement. Additionally, since the present invention can be used for hands-free communication, the need to carry a separate surveillance device is eliminated.

DETAIL DESCRIPTIONS OF THE INVENTION

All illustrations of the drawings are for the purpose of describing selected versions of the present invention and are not intended to limit the scope of the present invention.

The present invention introduces a multi-purpose headset. More specifically, the present invention introduces a headset that can be used as a personal surveillance device in addition to the regular headset capabilities. By utilizing the present invention, a user can obtain sufficient evidence of an incident of concern.

Figure 1:
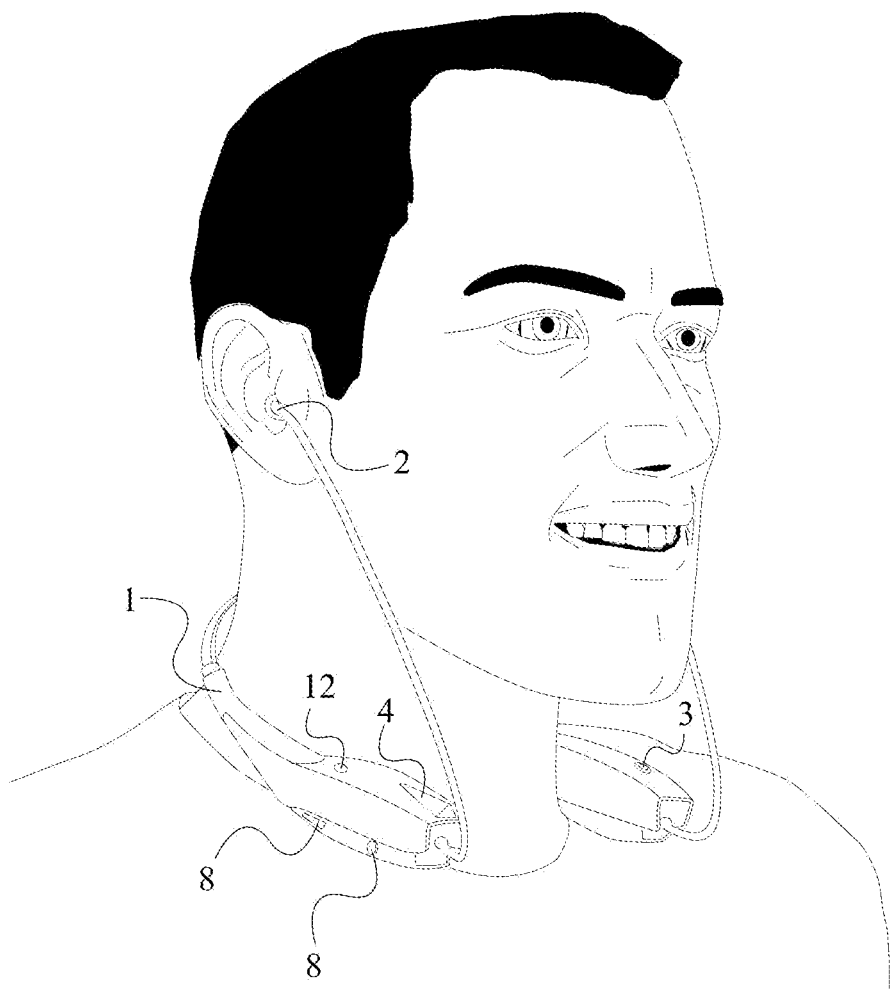
FIG. 1 is an illustration of the present invention being used.
Figure 2:
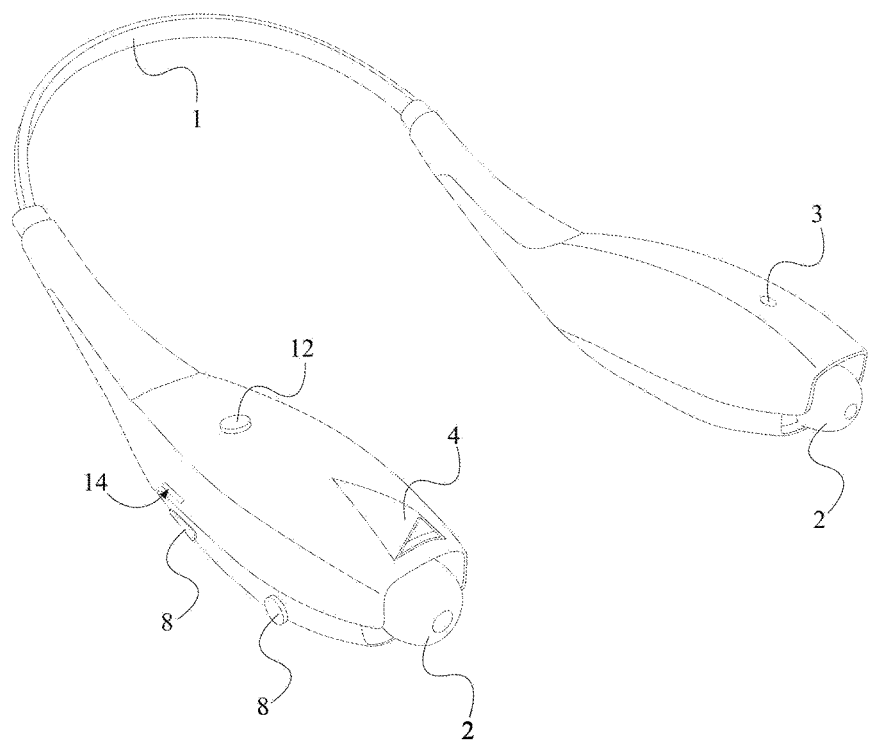
FIG. 2 is a perspective view of the present invention.
Figure 7:
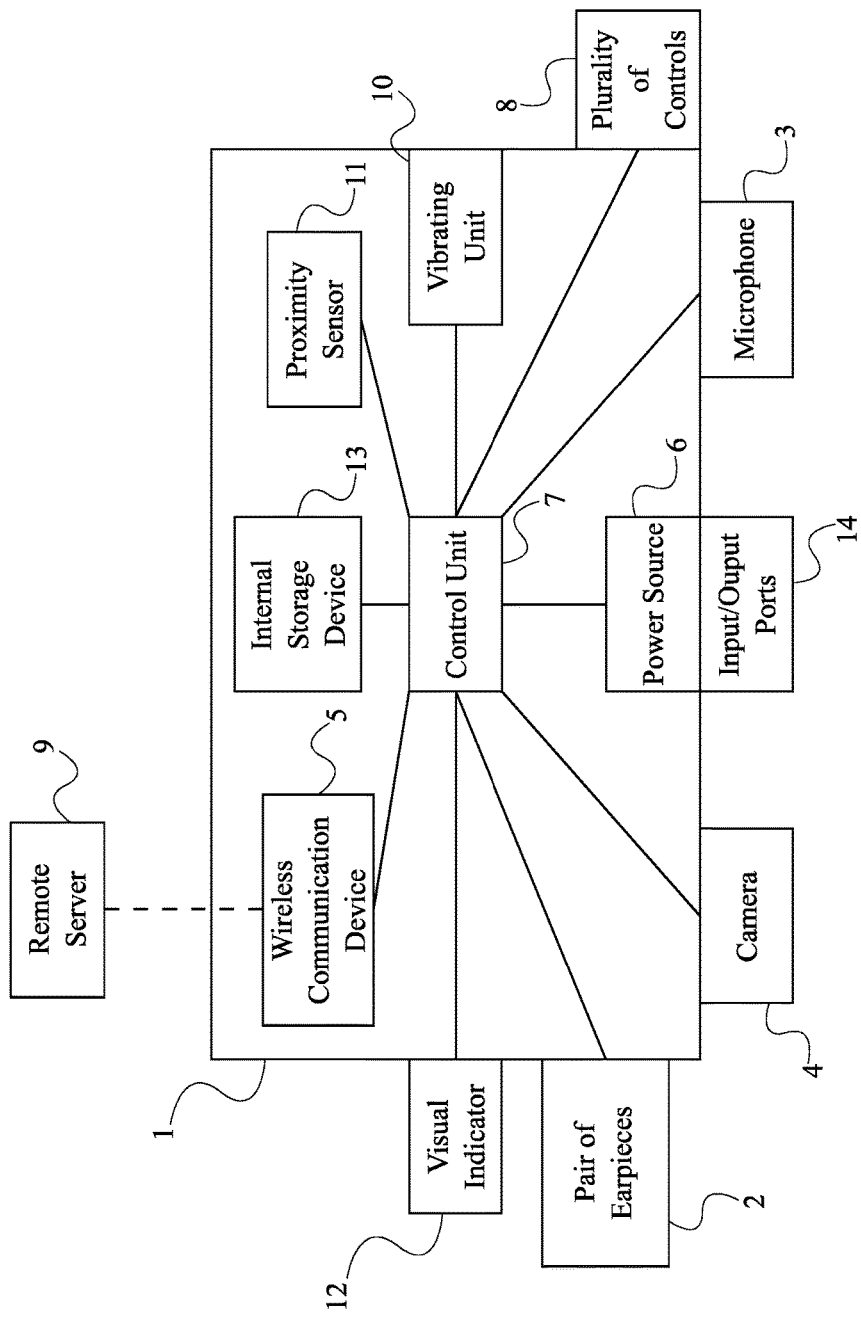
FIG. 7 is a block diagram illustrating the electronic connection between the components of the present invention.

As illustrated in FIG. 1, FIG. 2, and FIG. 7, the present invention comprises a main body 1, a pair of earpieces 2, a microphone 3, a camera 4, a wireless communication device 5, a power source 6, and a control unit 7. The main body 1 is used to hold and position the remaining components of the present invention. Preferably, the main body 1 is made of a lightweight material for user convenience. The pair of earpieces 2 is used for audio playback. When the present invention is in use, the microphone 3 is used for receiving and processing audio around the present invention. The wireless communication device 5 allows the present invention to be wirelessly connected to a mobile device or wirelessly transfer data when required. The power source 6 provides power to the electronic components of the present invention. The control unit 7 is used to manage the power distribution and functionalities of the present invention. More specifically, the personal surveillance functionalities and the headset functionalities of the present invention are managed by the control unit 7.

Figure 5:
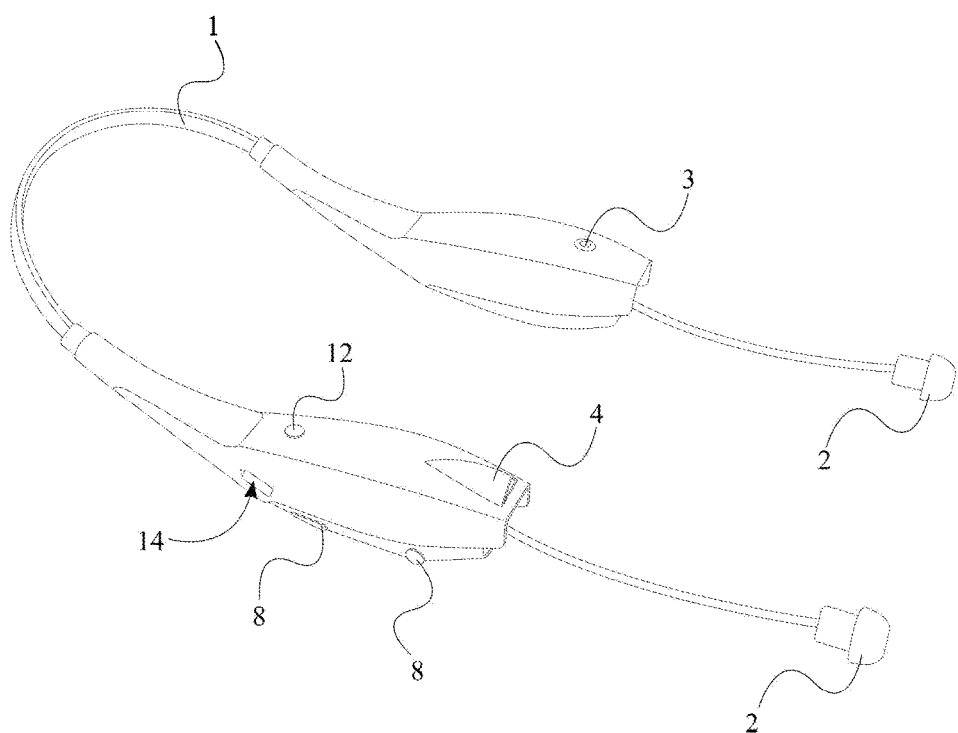
FIG. 5 is another perspective view of the present invention, wherein the pair of earpieces extend from the main body.

As discussed before, the present invention is intended to be used as a discreet personal surveillance device. Thus, the present invention needs to be utilized as a regularly used headset. In the preferred embodiment, the pair of earpieces 2 terminally extend outwards from the main body 1 as seen in FIG. 2 and FIG. 5. Moreover, each of the pair of earpieces 2 is positioned opposite to each other across the main body 1. To maintain connectivity, the pair of earpieces 2 is electronically connected to the main body 1. When the main body 1 is positioned around the neck of the user, each of the pair of earpieces 2 can be conveniently worn on each ear of the user. To provide user comfort, each of the pair of earpieces 2 is positioned in a silicone cover. In the preferred embodiment of the present invention, the main body 1 is C-shaped so that the main body 1 can comfortably fit around the neck of the user. The main body 1 is preferably made of a flexible material so that the main body 1 can be adjusted per the neck of the user. The material properties and effective design of the main body 1 allows the user to wear the present invention around the neck even when not in use.

Figure 3:
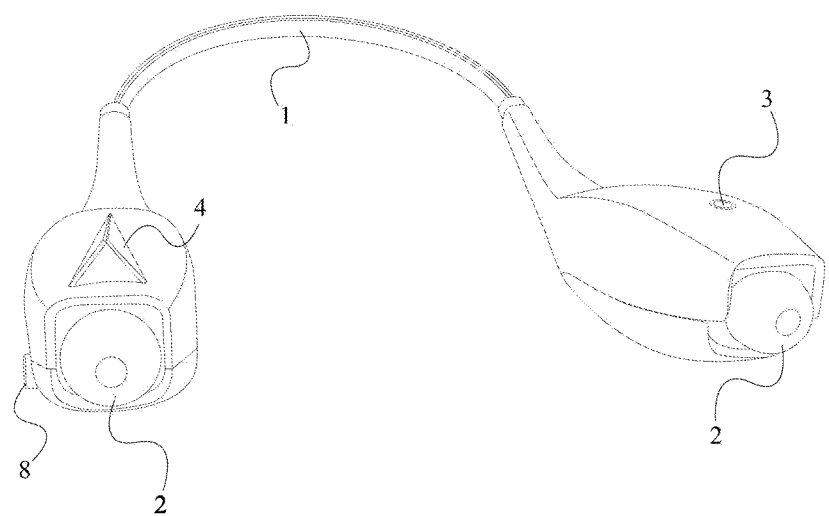
FIG. 3 is a front view of the present invention.

When utilizing the present invention as the headset and the personal surveillance device, the microphone 3 is used for recording audio. As illustrated in FIG. 2, FIG. 3, and FIG. 5, the microphone 3 is externally mounted onto the main body 1. The positioning on the main body 1 is such that the microphone 3 is positioned adjacent to the mouth of the user when the main body 1 is worn around the neck as shown in FIG. 1. The positioning of the microphone 3 is beneficial when making phone calls.

Similar to the microphone 3, the camera 4 is also externally mounted onto the main body 1 as seen in FIGS. 2-5. Preferably, the camera 4 is positioned so that any activity in front of the user can be captured when the main body 1 is worn around the neck. In other words, when the main body 1 is positioned around the neck, the camera 4 is oriented in the direction the user is facing. However, in a different embodiment of the present invention, another camera can be mounted onto the main body 1 to capture activity surrounding the user. The lens used in the camera 4 can vary from one embodiment to the other. Preferably, a wide-angle lens is used on the camera 4 so that a wide field of view can be captured.

As mentioned earlier, the power source 6 provides the necessary power to the electronic components of the present invention. The power source 6, which is positioned within the main body 1, is electrically connected to the control unit 7, the wireless communication device 5, the pair of earpieces 2, the microphone 3, and the camera 4. In the preferred embodiment of the present invention, the power source 6 is a rechargeable battery. However, the power source 6 can vary in other embodiments of the present invention. As an example, in another embodiment of the present invention, the power source 6 can removably attached or fixed to the main body 1.

The control unit 7 manages the headset functionalities and the personal surveillance functionalities of the present invention. As represented in FIG. 7, the control unit 7, which is also positioned within the main body 1, is electronically connected to the pair of earpieces 2, the microphone 3, the camera 4, and the wireless communication device 5. The electronic connection allows the user to execute a preferred functionality.

Figure 4:
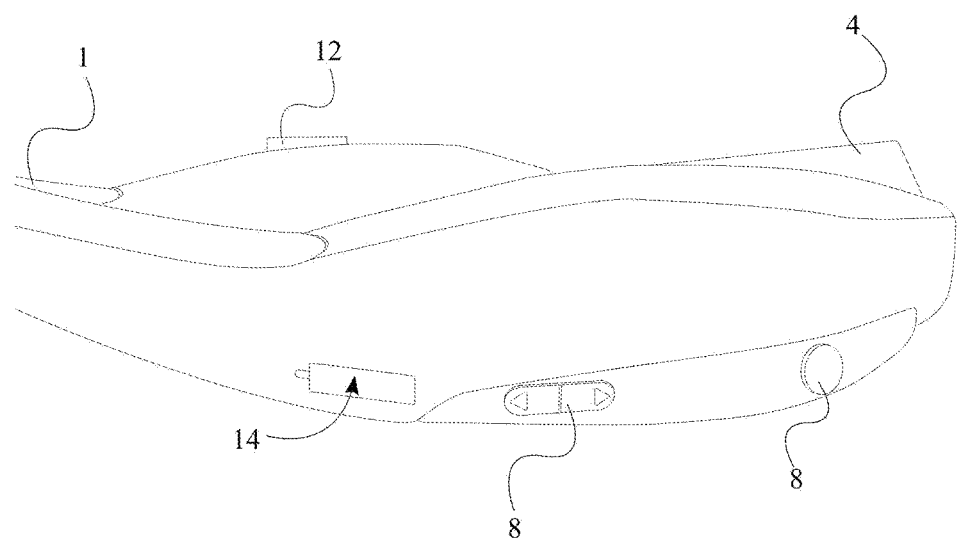
FIG. 4 is a side view of the present invention.

As seen in FIG. 4, the present invention further comprises a plurality of controls 8 that is used in the process of executing the preferred functionality. The plurality of controls 8 can be, but is not limited to, volume control buttons, camera activation buttons, and data transfer control buttons. For user convenience, the plurality of controls 8 is externally mounted onto the main body 1. The present invention executes the preferred functionality per the user input. To do so, the plurality of controls 8 is electronically connected to the control circuit.

Figure 6:
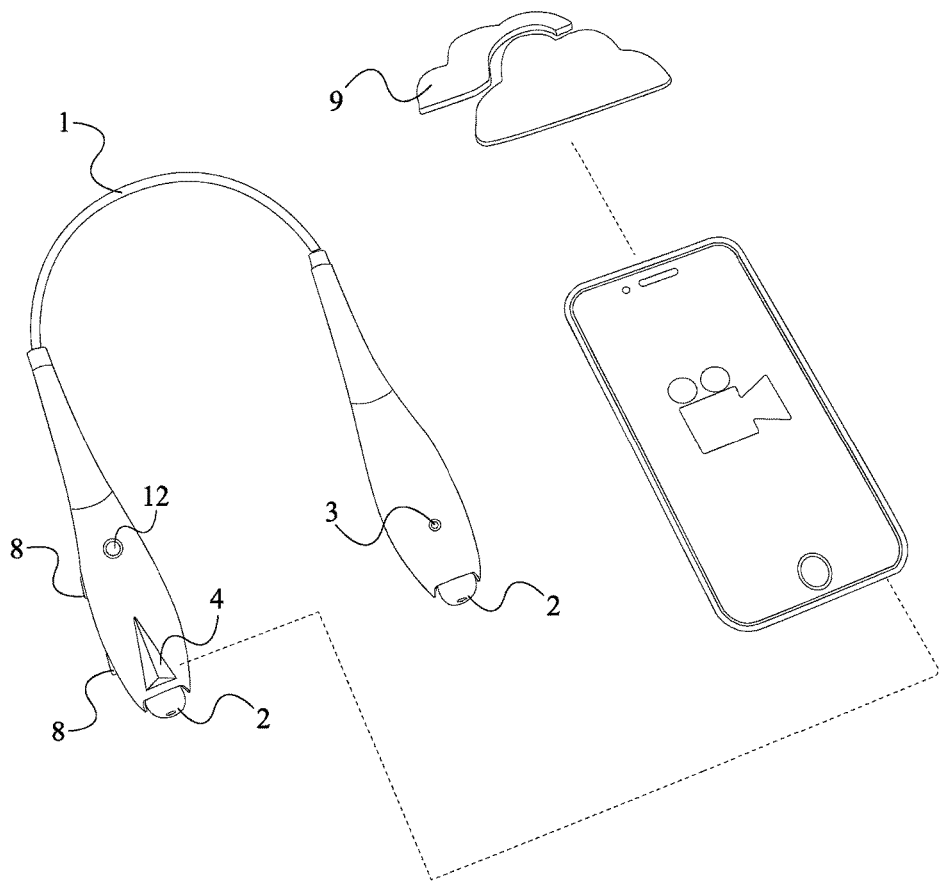
FIG. 6 is an illustration of the present invention being wirelessly connected to a mobile device and a remote server.

As illustrated in FIG. 6, the present invention further comprises a remote server 9 which is communicably coupled with the wireless communication device 5 positioned within the main body 1. The remote server 9 serves as an external storage for the present invention. For instance, the remote server 9 can be utilized when the user requires extra space for storing data. The user can access and retrieve any required information from the remote server 9.

As further illustrated in FIG. 6, the present invention is wirelessly connected to a mobile device or other comparable device. To be connected to the mobile device, the present invention needs to be used within a predetermined radius of the mobile device. The predetermined radius can vary from one embodiment to the other. To prompt the user to be within the predetermined radius of the mobile device, the present invention further comprises a vibrating unit 10 and a proximity sensor 11 which are electronically connected to each other. The proximity sensor 11 is communicably coupled with the mobile device via the wireless communication device 5 and monitors the distance from the present invention to the mobile device. When the user is beyond the predetermined radius from the paired mobile device, the vibrating unit 10 and the pair of earpieces 2 are used to notify the user via vibration and sound. Both the vibrating unit 10 and the proximity sensor 11 are positioned within the main body 1 and are electronically connected to the control unit 7. In addition to notifying the user regarding the distance from the mobile device, the vibrating unit 10 can also be programmed to alert the user regarding mobile device functionalities such as text messages and phone calls. For instance, the vibrating unit 10 can be programmed to vibrate when the paired mobile device receives a phone call.

The present invention further comprises a visual indicator 12 which is externally mounted onto the main body 1. The visual indicator 12 is appropriately positioned to be promptly seen by the user. In the preferred embodiment, the visual indicator 12 is at least one light emitting diode (LED). However, the visual indicator 12 can vary in other embodiments of the present invention. The visual indicator 12 is used to indicate the wireless connection strength, power level of the power source 6 and other comparable information. To do so, the visual indicator 12 is electrically connected to the power source 6 and electronically connected to the control circuit. Thus, the visual indicator 12 can respond to other component functionalities of the present invention.

The present invention utilizes an internal storage device 13 to store data. The internal storage device 13, which is positioned within the main body 1, can vary from one embodiment to the other. To save and manage data from the camera 4, the microphone 3 and other comparable components, the internal storage device 13 is electrically connected to the power source 6 and is electronically connected to the control unit 7.

To provide information and retrieve information as necessary, the present invention utilizes a plurality of input/output ports 14. Additionally, one of the plurality of input/output ports 14 can be used to charge the power source 6. In the preferred embodiment of the present invention, each of the plurality of input/output ports 14 is a universal serial bus (USB) port. However, the plurality of input/output ports 14 can be different in other embodiments of the present invention. The plurality of input/output ports 14, which is electronically connected to the control unit 7, traverses into the main body 1.

When the present invention is in use, the following process flow is generally followed. Initially, the present invention is wirelessly paired with the mobile device via the wireless communication device 5. Next, the main body 1 is positioned around the neck of the user. The C-shape of the main body 1 allows the user to conveniently position the main body 1 around the neck. If the user intends on utilizing the headset functionalities, each of the pair of earpieces 2 is inserted into each ear. Since the present invention is wirelessly connected to the mobile device, the microphone 3 and the pair of earpieces 2 can be used during a phone call. When the camera 4 needs to be used, the user activates a relevant control from the plurality of controls 8. Thus, the camera 4 initiates capturing footage until the recording is stopped by the user. The recorded information will be stored on the internal storage device 13 and duplicated on the remote server 9. When stored data needs to be retrieved from the internal storage device 13, the plurality of input/output ports 14 is used in conjunction with a USB cable. The USB cable can also be used to charge the power source 6. The visual indicator 12 is used to notify the user of the connectivity status and other comparable information. By utilizing the present invention, basic needs of a headset and personal surveillance needs can be fulfilled.

Although the invention has been explained in relation to its preferred embodiment, it is to be understood that many other possible modifications and variations can be made without departing from the spirit and scope of the invention as hereinafter claimed.

What is claimed is:

1. A headset with multimedia capabilities comprises:
a main body;
a pair of earpieces;
a microphone;
a camera;
a wireless communication device;
a power source;
a control unit;
the pair of earpieces terminally extending from the main body;

the camera and the microphone being externally mounted onto the main body;

the power source being electrically connected to the control unit, the wireless communication device, the pair of earpieces, the microphone, and the camera;

the pair of earpieces, the microphone, the camera, the wireless communication device being electronically connected to the control unit;

the wireless communication device, the control unit, and the power source being positioned within the main body;

a vibrating unit;

a proximity sensor;

the vibrating unit and the proximity sensor being positioned within the main body;

the vibrating unit and the proximity sensor being electronically connected to each other; and the vibrating unit and the proximity sensor being electronically connected to the control unit; and wherein said proximity sensor is adapted to be communicably coupled with a mobile device via said wireless communication device and monitor the distance from said headset to said mobile device, such that when said headset is beyond a predetermined radius from said mobile device the vibrating unit and said pair of earpieces can be used to notify a user via vibration and sound.

2. The headset with multimedia capabilities as claimed in claim 1 further comprises:

a plurality of controls;

the plurality of controls being externally mounted onto the main body; and the plurality of controls being electronically connected to the control unit.

3. The headset with multimedia capabilities as claimed in claim 1 further comprises:

a remote server; and the wireless communication device being communicably coupled with the remote server.

4. The headset with multimedia capabilities as claimed in claim 1 further comprises:

a visual indicator;

the visual indicator being externally mounted onto the main body;

the visual indicator being electrically connected to the power source; and the visual indicator being electronically connected to the control circuit.

5. The headset with multimedia capabilities as claimed in claim 4, wherein the visual indicator is at least one light emitting diode (LED).

6. The headset with multimedia capabilities as claimed in claim 1 further comprises:

an internal storage device;

the internal storage device being positioned within the main body;

the power source being electrically connected to the internal storage device; and the control circuit being electronically connected to the internal storage device.

7. The headset with multimedia capabilities as claimed in claim 1 further comprises:

a plurality of input/output ports;

the plurality of input/output ports traversing into the main body; and the plurality of input/output ports being electronically tethered to the control unit.

8. The headset with multimedia capabilities as claimed in claim 7, wherein each of the plurality of input/output ports is a universal serial bus (USB) port.

9. The headset with multimedia capabilities as claimed in claim 1, wherein the power source is a rechargeable battery.

10. The headset with multimedia capabilities as claimed in claim 1, wherein the main body is C-shaped.

* * * * *